(12) United States Patent
Book et al.

(10) Patent No.: US 11,449,993 B2
(45) Date of Patent: Sep. 20, 2022

(54) AUTOMATED BONE SEGMENTATION IN IMAGES

(71) Applicant: PERSIMIO LTD., Beer-Sheva (IL)

(72) Inventors: Gilad Book, Yeruham (IL); Zohar Yosibash, Lehavim (IL); Nir Trabelsi, Meitar (IL)

(73) Assignee: PERSIMIO LTD., Beer-Sheva (IL)

( * ) Notice: Subject to any disclaimer, the term of this patent is extended or adjusted under 35 U.S.C. 154(b) by 61 days.

(21) Appl. No.: 16/980,559

(22) PCT Filed: Mar. 12, 2019

(86) PCT No.: PCT/IL2019/050274
§ 371 (c)(1),
(2) Date: Sep. 14, 2020

(87) PCT Pub. No.: WO2019/175870
PCT Pub. Date: Sep. 19, 2019

(65) Prior Publication Data
US 2021/0004956 A1 Jan. 7, 2021

Related U.S. Application Data

(60) Provisional application No. 62/641,483, filed on Mar. 12, 2018.

(51) Int. Cl.
*G06T 7/00* (2017.01)
*G06K 9/62* (2022.01)
(Continued)

(52) U.S. Cl.
CPC ......... *G06T 7/0012* (2013.01); *G06K 9/6267* (2013.01); *G06T 7/11* (2017.01);
(Continued)

(58) Field of Classification Search
CPC ......... G06T 7/0012; G06T 7/11; G06T 7/174; G06T 11/008; G06T 2207/10072;
(Continued)

(56) References Cited

U.S. PATENT DOCUMENTS

| 9,495,752 B2 | 11/2016 | Wu et al. |
| 2002/0177770 A1* | 11/2002 | Lang ..................... A61B 5/055 600/410 |

(Continued)

OTHER PUBLICATIONS

Kunlei Zhang et al., "The unified extreme learning machines and discriminative random fields for automatic knee cartilage and meniscus segmentation from multi-contrast MR images", Springer-Verlag Berlin Heidelberg, Machine Vision and Applications, vol. 24 pp. 1459-1472, 2013.
Ying Xia et al., "Automated bone segmentation from large field of view 3D MR images of the hip joint", Physics in Medicine and Biology, vol. 58 Issue 20 pp. 7375-7390, 2013.
Jérôme Schmid et al., "Robust statistical shape models for MRI bone segmentation in presence of small field of view", Medical Image Analysis, vol. 15 Issue 1 pp. 155-168, 2011.
(Continued)

*Primary Examiner* — Bobbak Safaipour
*Assistant Examiner* — Duy Tran
(74) *Attorney, Agent, or Firm* — The Roy Gross Law Firm, LLC; Roy Gross

(57) ABSTRACT

A method for automated segmentation of a bone in an image dataset of a region of a human body, wherein said region comprises at least two adjacent bones, and wherein one of the bones comprises a shaft region and a head region, the method comprising identifying in the image dataset voxels belonging to a contiguous volume comprising both bones based on a density threshold; extracting a subset comprising the head region of the first bone, based on a boundary image slice; and applying a trained machine learning classifier to said subset, to generate a classification of each of voxel as belonging to one of the bones or a none-bone tissue.

20 Claims, 18 Drawing Sheets

(51) Int. Cl.
    *G06T 11/00* (2006.01)
    *G06T 7/11* (2017.01)
    *G06T 7/174* (2017.01)

(52) U.S. Cl.
    CPC .......... *G06T 7/174* (2017.01); *G06T 11/008* (2013.01); *G06T 2207/10072* (2013.01); *G06T 2207/20081* (2013.01); *G06T 2207/30008* (2013.01)

(58) Field of Classification Search
    CPC .......... G06T 2207/20081; G06T 2207/30008; G06K 9/6267
    See application file for complete search history.

(56) References Cited

U.S. PATENT DOCUMENTS

| | | | |
|---|---|---|---|
| 2011/0282473 A1* | 11/2011 | Pavlovskaia | G06T 17/20 700/98 |
| 2015/0235363 A1* | 8/2015 | Bar-Shalev | A61B 6/505 382/131 |
| 2015/0348259 A1* | 12/2015 | Souza | A61B 6/466 382/131 |
| 2016/0171698 A1* | 6/2016 | Razeto | G06T 7/33 382/128 |
| 2016/0275674 A1* | 9/2016 | Rivet-Sabourin | G06T 7/174 |
| 2017/0352157 A1 | 12/2017 | Madabhushi et al. | |

OTHER PUBLICATIONS

Jurgen Fripp et al., "Automatic segmentation of the bone and extraction of the bone cartilage interface from magnetic resonance images of the knee", Physics in Medicine and Biology, vol. 52 Issue 6 pp. 1617-1631, 2007.

Chengwen Chu et al., "Facts: fully automatic CT segmentation of a hip joint", Annals of Biomedical Engineering, vol. 43 Issue 5 pp. 1247-1259, 2015.

Yuanzhi Cheng et al.. "Automatic segmentation technique for acetabulum and femoral head in CT images", Pattern Recognition, vol. 46 Issue 11, pp. 2969-2984, 2013.

Reza Aghaeizadeh Zoroofi et al., "Automated segmentation of acetabulum and femoral head from 3-D CT images", IEEE Transactions on Information Technology in Biomedicine, vol. 7 Issue 4 pp. 329-343, 2003.

Futoshi Yokota et al., "Automated CT segmentation of diseased hip using hierarchical and conditional statistical shape models", Medical Image Computing and Computer-Assisted Intervention—MICCAI 2013, Springer, Berlin, Heidelberg, Lecture Notes in Computer Science, vol. 8150 pp. 190-197, 2013.

PCT Search Report for International Application No. PCT/IL2019/050274 dated Jul. 8, 2019, 3 pp.

PCT Written Opinion for International Application No. PCT/IL2019/050274 dated Jul. 8, 2019, 5 pp.

PCT Preliminary Report on Patentability for International Application No. PCT/IL2019/050274 dated Jul. 4, 2019, 6 pp.

* cited by examiner

AUTOMATED BONE SEGMENTATION IN IMAGES

CROSS-REFERENCE TO RELATED APPLICATIONS

This application is a National Phase of PCT Patent Application No. PCT/IL2019/050274 having International filing date of Mar. 12, 2019, which claims the benefit of priority under 35 U.S.C. § 119(e) of U.S. Provisional Patent Application No. 62/641,483 filed Mar. 12, 2018, entitled "Automated Bone Segmentation in Images", the contents of which are incorporated herein by reference in their entirety.

FIELD OF THE INVENTION

The invention relates to the field of medical imaging.

BACKGROUND

Segmentation of medical images such as computed tomography (CT), magnetic resonance imaging (MRI), and the like, is of major importance in clinical practice. The purpose of the segmentation is to isolate a volume of interest, for example a particular bone such as the femur, within an image. Such segmentations are usually performed manually or semi-automatically. However, because more images are being produced than ever before, medical professionals face a heavy workload caused by the need to manually analyze them. In addition, medical images often contain invisible information which needs to be processed to become visible to the medical professional analyzing the image.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, A system comprising at least one hardware processor; and a non-transitory computer-readable storage medium having stored thereon program instructions, the program instructions executable by the at least one hardware processor to: receive an image dataset comprising a plurality of consecutive cross-sectional two-dimensional (2-D) images of a region of a human body, wherein said region comprises at least a portion of a first bone adjacent at least a portion of a second bone, and wherein said at least a portion of said first bone comprises at least a portion of a shaft region and a head region, identify in the image dataset a plurality of voxels belonging to a contiguous volume comprising said at least a portion of said first bone and said at least a portion of said second bone, wherein said identifying is based on each of said voxels meeting a specified threshold, extract from said image dataset a subset of said images comprising voxels belonging only to said head region and said at least a portion of said second bone, wherein said extracting is based, at least in part, on identifying one of said images as a boundary image, and apply a trained machine learning classifier to said subset, to classify each of said voxels in said subset as belonging to one of: said first bone, said second bone, and a none-bone tissue.

There is also provided, in an embodiment, a method for automated segmentation of a bone in an image, the method comprising: receiving an image dataset comprising a plurality of consecutive cross-sectional two-dimensional (2-D) images of a region of a human body, wherein said region comprises at least a portion of a first bone adjacent at least a portion of a second bone, and wherein said at least a portion of said first bone comprises at least a portion of a shaft region and a head region; identifying in the image dataset a plurality of voxels belonging to a contiguous volume comprising said at least a portion of said first bone and said at least a portion of said second bone, wherein said identifying is based on each of said voxels meeting a specified threshold; extracting from said image dataset a subset of said images comprising voxels belonging only to said head region and said at least a portion of said second bone, wherein said extracting is based, at least in part, on identifying one of said images as a boundary image; and applying a trained machine learning classifier to said subset, to classify each of said voxels in said subset as belonging to one of: said first bone, said second bone, and a none-bone tissue.

There is further provided, in an embodiment, a computer program product for automated segmentation of a bone in an image, the computer program product comprising program code embodied on a non-transitory computer-readable storage medium, the program code executable by at least one hardware processor to: receive an image dataset comprising a plurality of consecutive cross-sectional two-dimensional (2-D) images of a region of a human body, wherein said region comprises at least a portion of a first bone adjacent at least a portion of a second bone, and wherein said at least a portion of said first bone comprises at least a portion of a shaft region and a head region; identify in the image dataset a plurality of voxels belonging to a contiguous volume comprising said at least a portion of said first bone and said at least a portion of said second bone, wherein said identifying is based on each of said voxels meeting a specified threshold; extract from said image dataset a subset of said images comprising voxels belonging only to said head region and said at least a portion of said second bone, wherein said extracting is based, at least in part, on identifying one of said images as a boundary image; and apply a trained machine learning classifier to said subset, to classify each of said voxels in said subset as belonging to one of: said first bone, said second bone, and a none-bone tissue.

In some embodiments, said program instructions are further executable to train, and said method further comprises training, said machine learning classifier, at a training stage, on a training set comprising (i) a plurality of voxels belonging to one of said first bone, said second bone, and a none-bone tissue; and (ii) labels associated with each of said first bone, said second bone, and said non-bone tissue. In some embodiments, said plurality of voxels are labeled with said labels. In some embodiments, said voxels labeled as said first bone comprise at least 40% of said plurality of voxels.

In some embodiments, said image dataset is a tomographic image dataset acquired through a technique selected from the group consisting of: computed tomography (CT), magnetic resonance imaging (MRI), positron emission tomography (PET), single photon emission tomography, ultrasound, and X-ray.

In some embodiments, said first bone is selected from the group consisting of: a femur, a tibia, a fibula, a humerus, a radius, and an ulna.

In some embodiments, said specified threshold is a density threshold having a range of between 75 and 250 on the Hounsfield Unit (HU) scale.

In some embodiments, said identifying is based, at least in part, on a similarity metric between said boundary image and one or more consecutive images within said image dataset. In some embodiments, similarity metric is based, at least in part, on a number of voxels belonging to a largest connected component in each of said boundary image and said one or more consecutive images.

In some embodiments, said machine learning classifier comprises one or more convolutional neural networks (CNN).

There is further provided, in an embodiment, a method for automated segmentation of a bone in an image, the method comprising: receiving an image dataset comprising a plurality of consecutive cross-sectional two-dimensional (2-D) images of a region of a human body, wherein said region comprises at least a portion of a first bone adjacent at least a portion of a second bone; identifying in the image dataset a plurality of voxels belonging to a contiguous volume comprising said at least a portion of said first bone and said at least a portion of said second bone, wherein said identifying is based on each of said voxels meeting a specified threshold; extracting from said image dataset a subset of said images comprising voxels belonging only to said head region and said at least a portion of said second bone, wherein said extracting is based, at least in part, on identifying one of said images as a boundary image; and applying a trained machine learning classifier to said image dataset, to classify each of said voxels in said contiguous volume as belonging to one of: said first bone, said second bone, and a none-bone tissue.

In some embodiments, the method further comprises training said machine learning classifier, at a training stage, on a training set comprising (i) a plurality of voxels belonging to one of said first bone, said second bone, and a none-bone tissue; and (ii) labels associated with each of said first bone, said second bone, and said non-bone tissue. In some embodiments, said plurality of voxels are labeled with said labels.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
FIGS. 1A-1B shows a CT scan of a human femur and pelvis.

Disclosed herein are a system and method for automated segmentation of bones in medical imaging.

As used herein, "tomographic imaging" refers to techniques and processes of creating visual representations of internal anatomical structures throughout the human body, including bones, blood vessels, vertebrae, major organs, as well as unhealthy structures (tumors, injuries, lesions, and the like). Tomographic imaging techniques include, among others, computed tomography (CT), magnetic resonance imaging (MRI), positron emission tomography (PET), single photon emission tomography, ultrasound, and X-ray.

"Image dataset" refers to a series of consecutive two-dimensional (2-D) cross-sectional 'slice' images acquired through tomographic imaging. A three-dimensional (3-D) volume can be constructed from a tomographic image dataset.

"Segmentation" refers to the process of partitioning an image into different meaningful segments, which may correspond to different tissue classes, organs, pathologies, and/or other biologically relevant structures.

Certain embodiments of the present disclosure provide for an automated and accurate segmentation of a human bone having regions with complex geometry, that is adjacent to other bones and/or and tissue with similar density properties.

The following discussion will focus on an exemplary application of the present disclosure in the area of human femur segmentation in tomographic imaging, and, specifically, CT scans. However, the present system and method are not limited to femur segmentation only, and can be applied in connection with any bone comprising an elongated body or shaft, and an articular or head region which comprises at least one of a ball, a socket, a neck, a trochanter, a trochlea, an acetabulum, and the like. Accordingly, certain embodiments of the present process can be applied with respect to various other complex bones, with only minor modifications to input parameters.

A typical CT image dataset consists of a series of 2-D images, or 'slices,' representing cross sections of a 3-D body region. Typically, the size represented by a 2-D pixel in a clinical CT slice is about $0.9 \times 0.9$ mm$^2$, and each slice typically contains either $512 \times 512$ or $1024 \times 1024$ pixels. The pitch between adjacent slices varies from scan to scan, but in normal clinical scans it varies between 0.5 to 2 mm. Because a human femur has an average length of about 443.6 mm, a typical CT scan dataset of an entire femur may consist of hundreds of 2-D images.

In general, segmentation of the proximal femur is achieved by manual selection of the boundaries of bone on CT images by an expert. As noted above, given the large number of 'slices' for a single subject acquired by CT during a scan session, manual segmentation is extremely time-consuming, generally requiring several hours for complete segmentation. In addition, the efficiency and repeatability of manual segmentation is influenced by the level of human expertise.

However, automated segmentation of the human femur presents several challenges, due to the complexity of its geometry and the fact that the shaft and femoral head have different density values. Automated segmentation methods which try to generalize a global phenomenon by applying the method to a complex object with a large variance between its parts (such as a femur), can lead to inaccuracy in the results or non-convergence of the entire solution.

Accordingly, in some embodiments, the present disclosure provides for automated segmentation of a femur in tomographic imaging comprising a two-part process. First, the femur in the image dataset is automatically divided into two regions: a relatively simple lower area comprising the femoral shaft, and a more complex upper area comprising the femoral head and part of the pelvis. Each of said two sub-volumes can then be segmented individually, using object classification methods. As noted, the preliminary step of subdividing a complex object into constituent elements before applying object classification will be discussed herein with respect to a human femur. However, the application of a preliminary division of a complex object into sub-volumes may be applied to other complex-shaped bones in various regions of the body.

In some embodiments, the object classification methods employed in the present process comprise convolutional neural networks (CNN). In some variations, one or more CNNs are trained to classify voxels belonging to at least the femur, the pelvis, and soft tissue, to achieve greater accuracy in delineating the boundaries of each bone. In other variations, the CNNs are trained to classify voxels belonging to at least the femur and the pelvis. In some embodiments, the CNNs are employed to perform segmentation of two or more adjacent bones in a region of the body, wherein the two or more adjacent bones may appear in a tomographic image as a contiguous volume. In some embodiments, the CNNs are being trained using a training set comprising a plurality of voxels, wherein each voxel is labelled as one of the two or more bones in the image, and/or as non-bone tissue.

With reference to FIG. 1, bones comprise an inhomogeneous structure, which may be generally classified into two types of tissue: cortical and trabecular. The outer shell of the bone is made of cortical bone tissue, shown as the relatively bright area in FIG. 1A, which is dense and exhibits a value of around 2000 units on the Hounsfield scale (HU). HU values represent the density of the material, ranging from −1000 (air) to 30,000 (metals such as gold and steel).

Figure 1B:
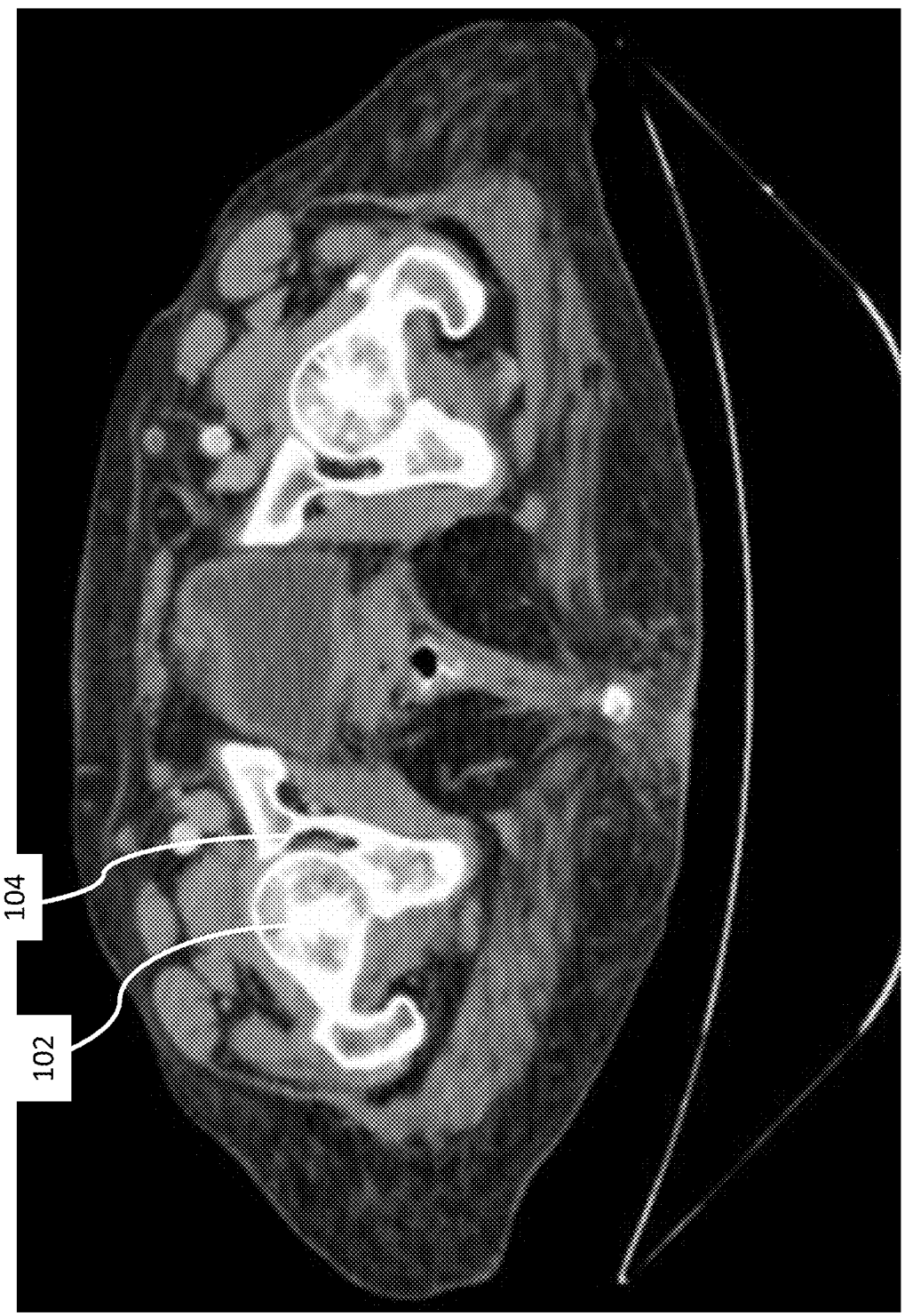

The trabecular bone tissue is made of soft and spongy tissue with relatively low HU (usually below 600, shown as darker areas in FIG. 1A). HU values typically can be obtained through tomographic imaging. However, segmenting bones in CT scans poses difficulties for two main reasons; first, the cortical bone is not dense enough through the inner part of the bone to be distinguishable from the tissue outside the bone. Second, the layer of cartilage that separates two adjacent bones with high HU values is sometimes not visible, and therefore separate bones can appear to be connected. As shown in FIG. 1B, the femoral head 102 appears to be connected to the pelvis 104. For these reasons, simple thresholding based on HU values is not useful for segmenting a single bone and separating it from the surrounding bones and/or other tissue.

Figure 2A:
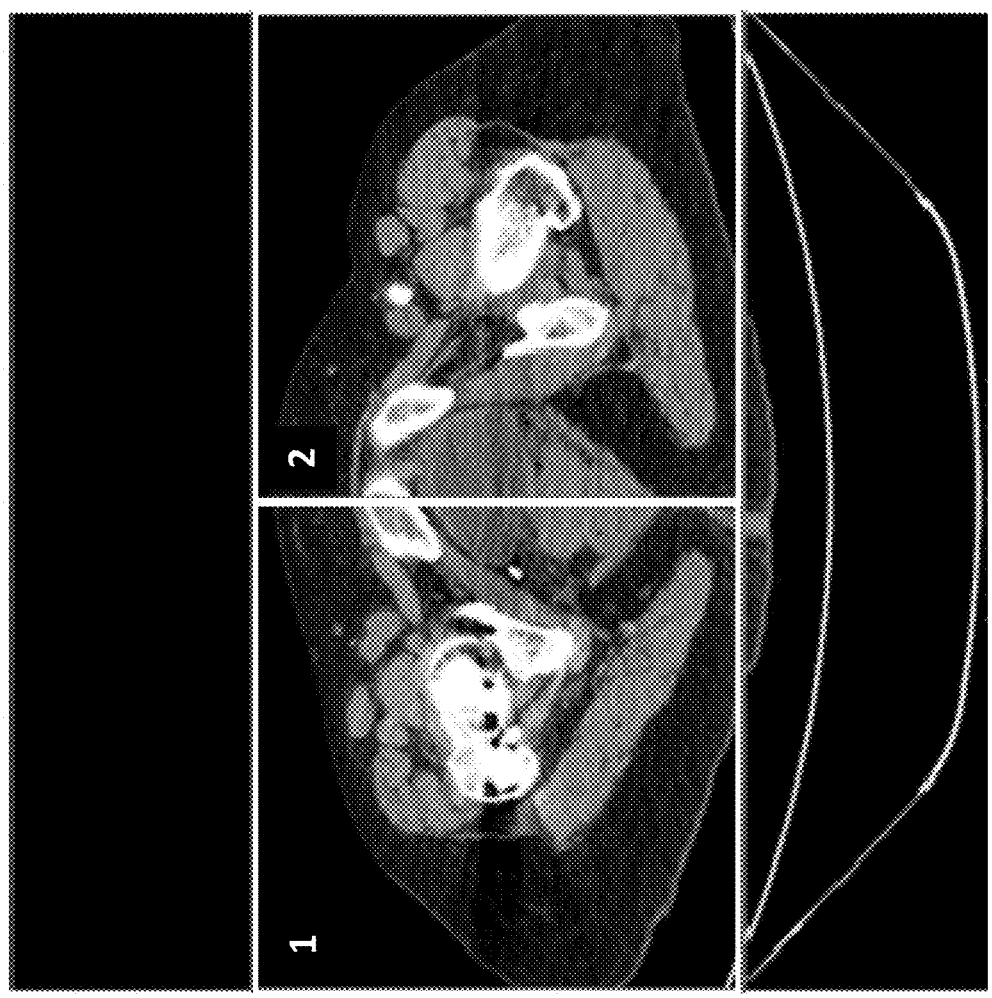
FIGS. 2A-2E illustrate initial segmentation stages in a process for automated segmenting of bones in medical imaging, according to an embodiment.

With reference to FIG. 2A, in some embodiments, a first step of the automated femur segmentation process according to the present disclosure comprises determining the areas of a CT image dataset in which femur tissue is located. Given a typical CT scan with a resolution of 512×512 pixels containing left and right femurs, it is assumed that the CT is performed along the femur, and that the lowest slice contains a part of the femoral shaft and the highest slice contains the pelvis at a height of 1-20 mm above the femoral head. The present process segments one femur at a time, so a cropped volume consisting of a quarter of the full scan is considered. See rectangles 1, 2 in FIG. 2A, representing the left and right femurs, respectively.

Figure 2B:
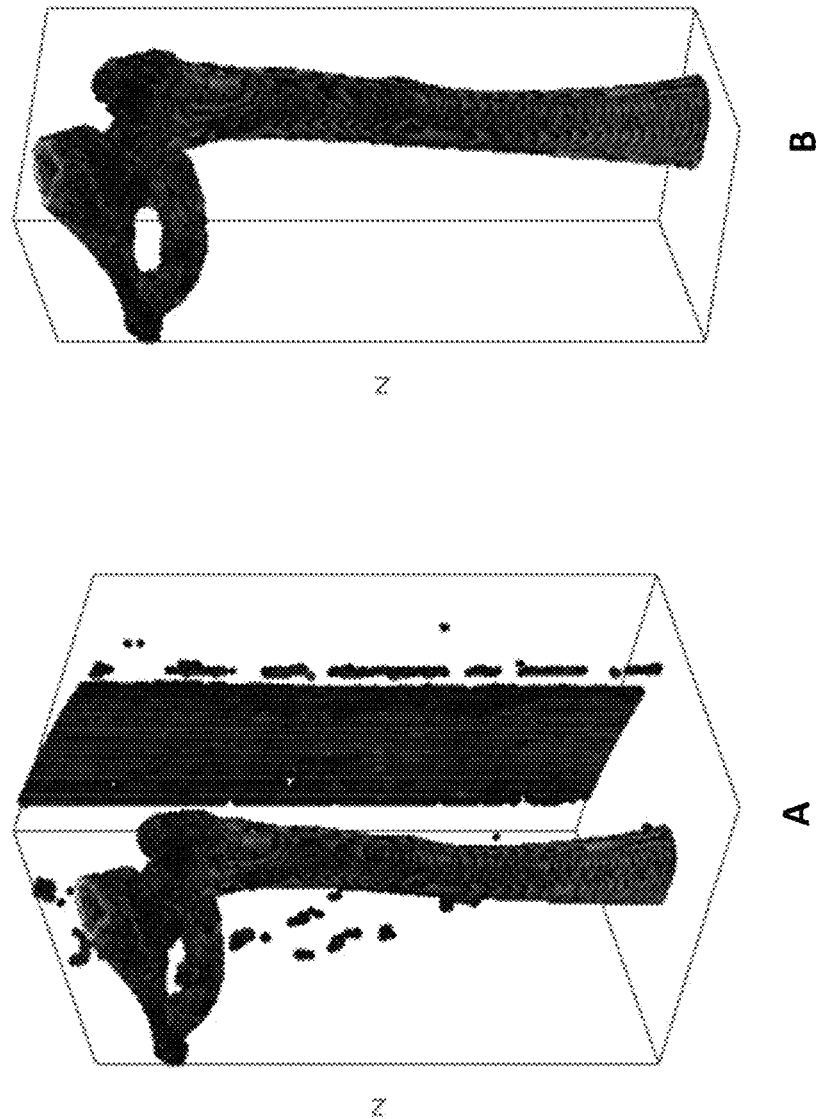

In some embodiments, the automated process then comprises an initial segmentation of objects in the image dataset based upon object density values, where a threshold value of, e.g., between 75 and 250 HU is used. In some embodiments, the threshold HU value is 150. With reference to panel A in FIG. 2B, the result of the initial segmentation thresholding stage is a binary mask, i.e., a volume with the size and resolution of the CT image dataset, where the value of each voxel is either 1 (represented by the dark areas in panel A) or 0 (represented by the light areas in panel A).

In some embodiments, following the initial segmentation described above, a search for the largest connected component in the volume is performed, e.g., by a Flood-Fill or a similar algorithm with a 9×9 neighborhood matrix. See, for example, Torbert, Shane (2016); Applied Computer Science (2nd ed.); Springer (published 2016 Jun. 1), p. 158. The 3-D volume is partitioned into separate connected components, and then all voxels that are not a part of the largest connected component are discarded. As shown in panel B in FIG. 2B, since the femur (with the pelvis bone which appears as still being attached to it at this stage) is the largest hard tissue object in the scan, it will be classified as the largest connected object. It should be noted that it is uncommon for the femur and pelvis to appear in a CT image dataset as two separate objects. Therefore, the initial segmentation stage will typically result in a largest connected object which comprises both the femur and pelvis, or portions thereof. Accordingly, further segmentation steps are required, as will be described below.

In some embodiments, there follows an image centralization stage. The cropped image described above with reference to FIG. 2A had a size of, e.g., $$\frac{S}{2} \times \frac{S}{2} \times N$$

where $S \in \{512, 1024\}$, and where S×S is the slice resolution (before cropping), and N is the number of slices of the original scan. Since the cropping described above is fixed and does not depend on the patient's position during the scan, it is possible that at the cropping step, part of the bone tissue may have been accidentally removed, therefore, the crop is corrected as follows: For the volume obtained so far, the center of mass is to be found in each slice, and the median of all mass centers is calculated for each axis (X, Y). The resulting point, P, is defined as the center of a window in size $$\frac{s}{2} \times \frac{s}{2}$$

where the scan will be re-cut:

$$P = \left( \text{median}\left( \frac{1}{n_i} \sum_{i=1}^{n_i} x_i \right), \text{median}\left( \frac{1}{n_i} \sum_{i=1}^{n_i} y_i \right) \right),$$

where $n_i$ is the number of voxels labeled as object in the i-th slice at this stage. This centralization ensures that all the relevant bone voxels are in the cropped image.

In some embodiments, after image centralization, the resulting image dataset is being further partitioned into two regions. As noted above, the heterogeneity of femur properties, in both texture, density, and geometry, makes is difficult to automatically segment an entire femur from the adjacent pelvis and/or other tissue. Accordingly, the bone mass previously identified as the largest connected object in the image dataset is partitioned into two separate regions: (i) a lower sub-volume containing a portion of the shaft of the femur, and (ii) an upper, or 'complex,' sub-volume containing mainly the head, neck, and greater trochanter of the femur, as well as a portion of the pelvis. Segmentation of the first, lower sub-volume containing the shaft is simpler, and common thresholding methods can produce satisfactory results in separating the shaft area from surrounding tissue. However, segmentation of the upper region is more challenging, and requires different, more complex methods. Therefore, correct partitioning of the entire volume into the two sub-volumes is essential for successful segmentation of the overall femur.

Figure 2C:
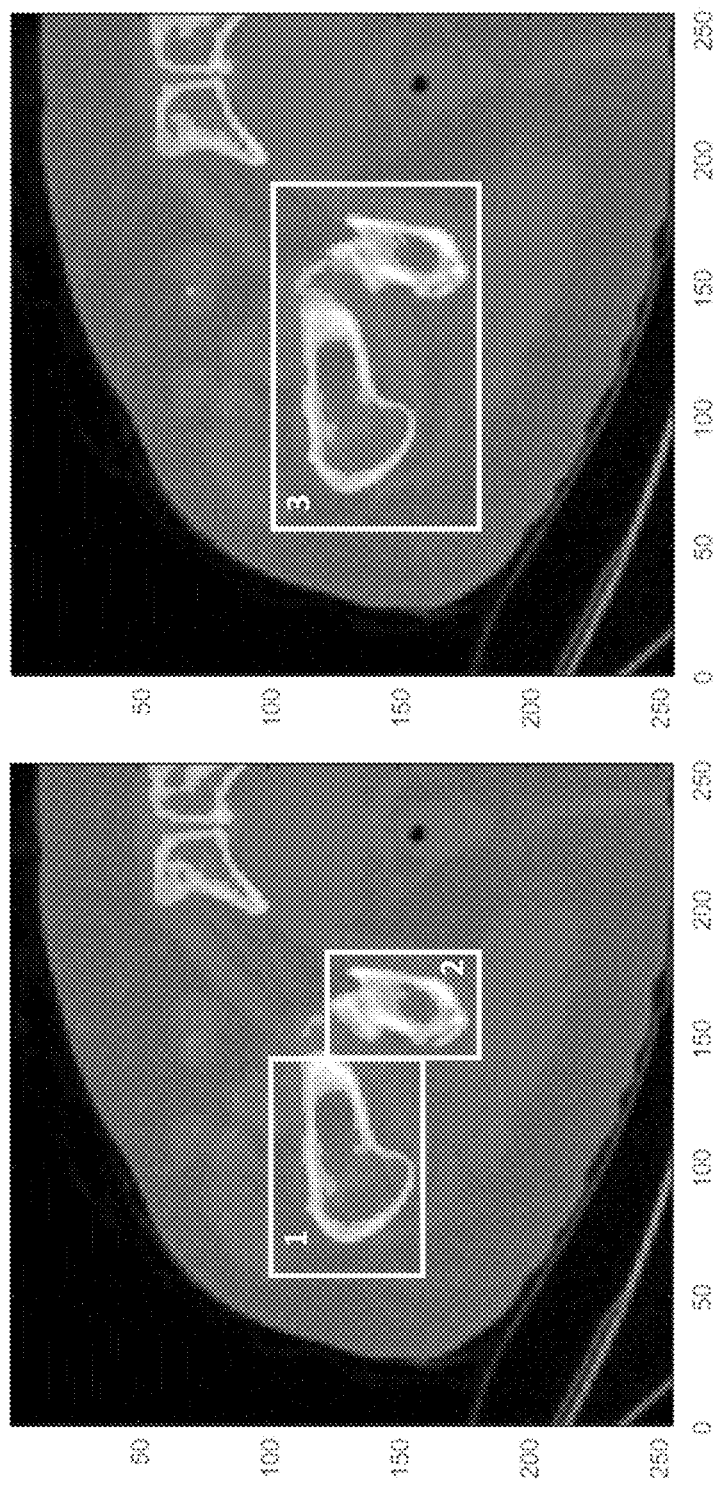

In some embodiments, the sub-volume segmentation is performed automatically by searching for a lowest 2-D image slice is the series comprising the CT image dataset which belongs to the upper, or complex, sub-volume. Finding the lowest slice of the complex volume (LSCV) is performed by considering the binary mask shown in panel B of FIG. 2B slice by slice, from bottom to top. In each slice, the volume of the entire binary mask up to the current slice is determined. Thus, in the first slice, only the lowest slice contributes to the volume. In the second slice, the volume of the two lowest slices is computed, and so on. For each slice, there is determined the largest connected component (as described above), as represented by the number of voxels that make up the volume. A monotonically increasing series of voxels is thus obtained. It should be noted that, beginning with a given CT slice, the binary mask also contains voxels that belong to the pelvis, but are not connected in the image to the femur, and thus not taken into account in the search for the LSCV. For example, with reference to FIG. 2C, panels A and B represent, respectively, two consecutive slices, e.g., slices 286 and 287, in an image dataset. In panel A, showing slice 286, following the initial thresholding described above based upon a density threshold of, e.g., HU 150, the highlighted areas represent bone tissue. The femur and the pelvis, noted respectively by rectangles 1 and 2, are both represented but are separated from each other. Therefore, only the femur (rectangle 1) is considered for purposes of the determination of the largest connected component. In the next slice 287, the femur and the pelvis already appear as connected and cannot be separated as in the lower slices, as noted by rectangle 3. Due to the similarities in HU values in the pelvis and femur, starting with slice 287, the two bones are considered a single component.

Figure 2D:
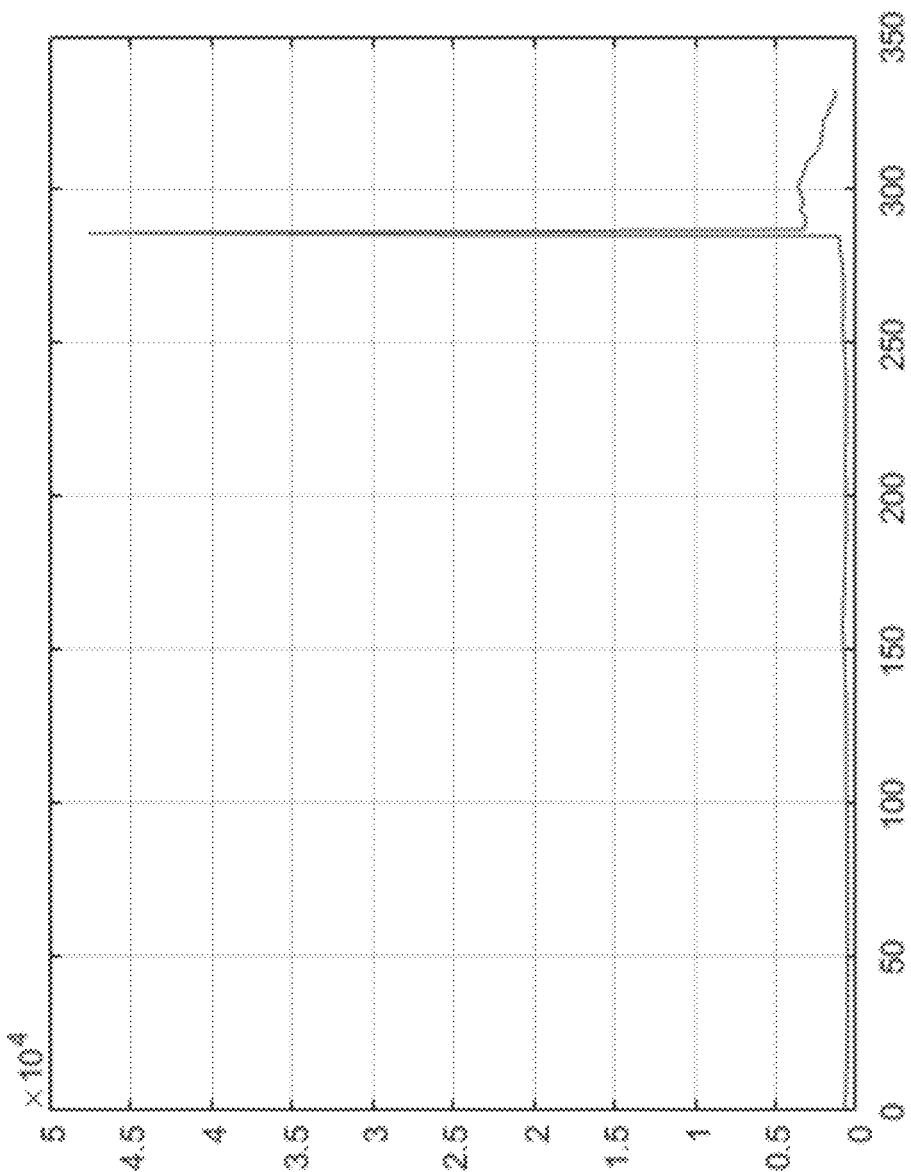

An examination of the entire series of slices can identify a slice in which, for the first time, the bones cannot be separated. This will translate into a significant increase (above at least three standard deviations) in the number of voxels that belong to the largest connected component. The graph in FIG. 2D shows differences in number of voxels in the largest connected component, as a function of slice number. The peak at slice 287 is indicative of the first slice at which the femur and the pelvis are connected. Accordingly, slice 287 may be designated as the LSCV.

Figure 2E:
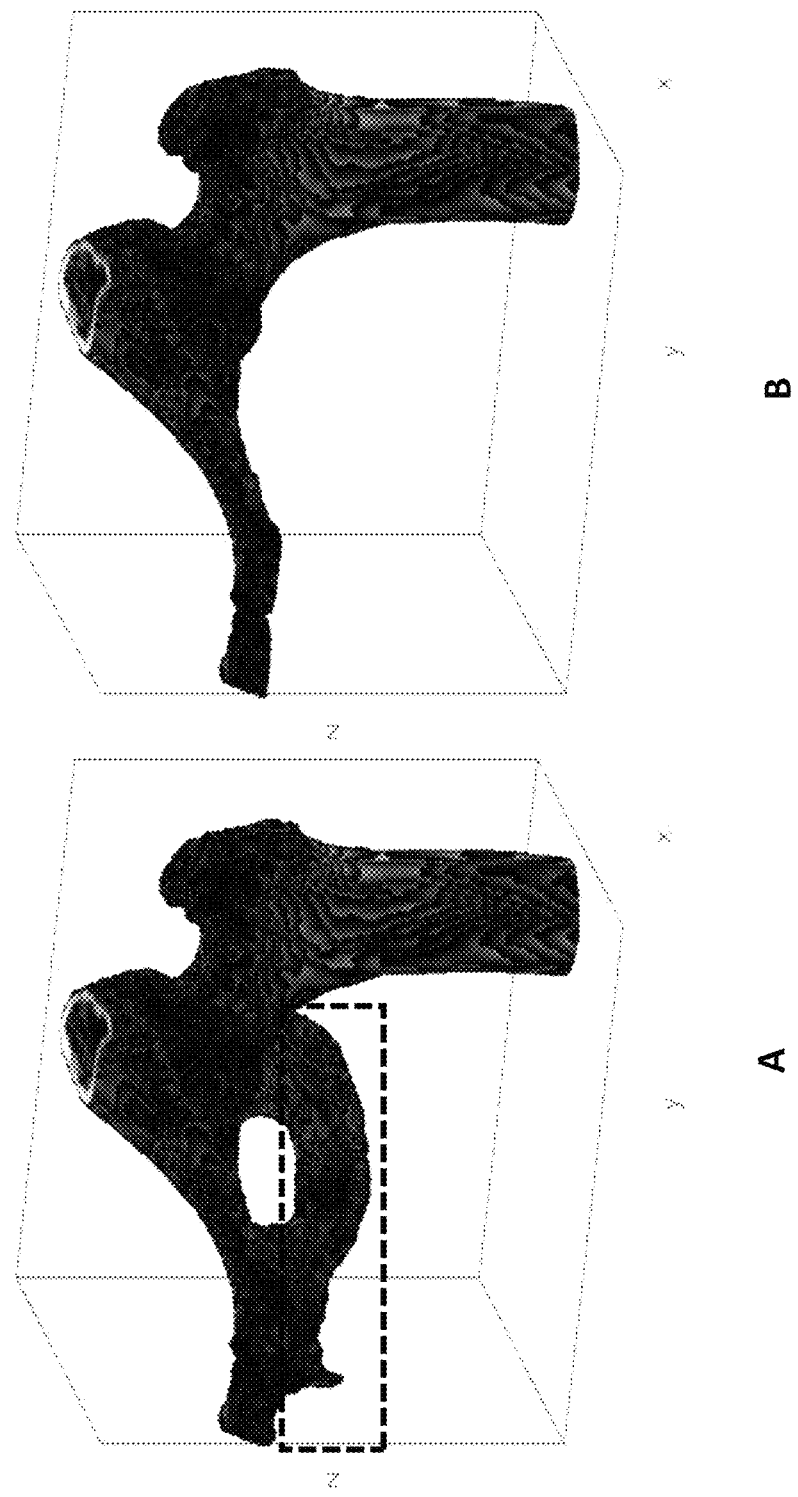

In some embodiments, voxels in slices below the LSCV that are not connected to the largest connected component, are marked as background. As shown in FIG. 2E, panel A is the segmented bone before LSCV finding, and panel B is the segmented bone after LSCV finding. As noted by a dashed rectangle in panel A, voxels belonging to the pelvis underneath the LSCV (i.e., voxels which are not connected to the largest connected mass) are cropped from the image dataset in panel B.

In some embodiments, the following exemplary algorithm is used for automatically finding the lowest slice of the complex volume:

```
for     sliceIndex = 1 :N
        subVolume = binaryMask ( : , : , 1 : sliceIndex ) ;
        largestConnComp = FindLargestConnComp ( subVolume ) ;
        subVolumesSize ( sliceIndex ) = size ( largestConnComp ) ;
end
subVolumesSize_diff = diff ( subVolumesSize ) ;
LSCV = FindIndexOfGlobalMaxima ( subVolumesSize_diff ) ;
% Remove pelvis in lower slices :
binaryMask ( : , : , 1 :LSCV☐1) = FindLargestConnComp
( binaryImage ( : , : , 1 :LSCV − 1)) ;
```

In some embodiments, after finding the LSCV, the automated process defines which voxels in the relevant slices are required for performing segmentation of the femoral head and pelvis using, e.g., convolutional neural networks (CNN) or a similar machine learning algorithm. In some embodiments, the voxels to be so classified are determined by using a dilation morphological operator on the binary mask in the previously obtained slices. See, for example, Haralick, Robert M., Stanley R. Sternberg, and Xinhua Zhuang; "Image analysis using mathematical morphology;" IEEE transactions on pattern analysis and machine intelligence 4 (1987): 532-550.

Figure 3A:
FIG. 3A illustrates the results of a dilated binary mask process in a process for automated segmenting of bones in medical imaging, according to an embodiment.

In some embodiments, the structuring element used is a sphere with radius of 6 voxels. FIG. 3A, panel A, shows an example of a slice with the binary mask generated so far; the highlighted voxels are all voxels with high HU. Panel B shows the same slice with the dilated binary mask. The dilation process extends the binary mask to include the femur boundary (the boundary is more important than the inner area because it is possible to fill any holes later, as will be further described below). In some embodiments, the dilation operation is done on the three-dimensional volume and not on each slice separately. In some embodiments, a radius of 6 voxels is used so as to ensure that the extended mask manages to include the whole bone boundary, while not enlarging the mask too much. In other embodiments, other structuring elements, and other dilation methods may be used.

In some embodiments, the resulting dilated mask comprises all the voxels on the femur boundary (in the relevant slices), as well as large parts of the pelvis and soft tissue surrounding the bones. In some embodiments, for each voxel marked by the dilated mask, two box-shaped neighborhoods centered at the current voxel are considered, and are used as inputs to the next stage of the segmentation process. Said boxes are of different sizes comprising respectively 25×25×5 ("Net25") and 51×51×5 ("Net51") voxels. The reason for creating two boxes is because each box describes different properties of the voxel that should be classified. The smaller box allows classifying the voxel according to the close neighborhood properties, while the larger box allows consideration of the global properties of the voxel neighborhood (location and its context within the whole bone). In both boxes, the size of each voxel is 1×1×2 mm$^3$, i.e., the volume of the smaller Net25 box is 25×25×10 mm$^3$, and the largest Net51 box volume is 51×51×10 mm$^3$. In this way, each box contains a known number of voxels representing a known physical volume. In other embodiments, networks of smaller or larger boxes may be considered.

Figure 3B:
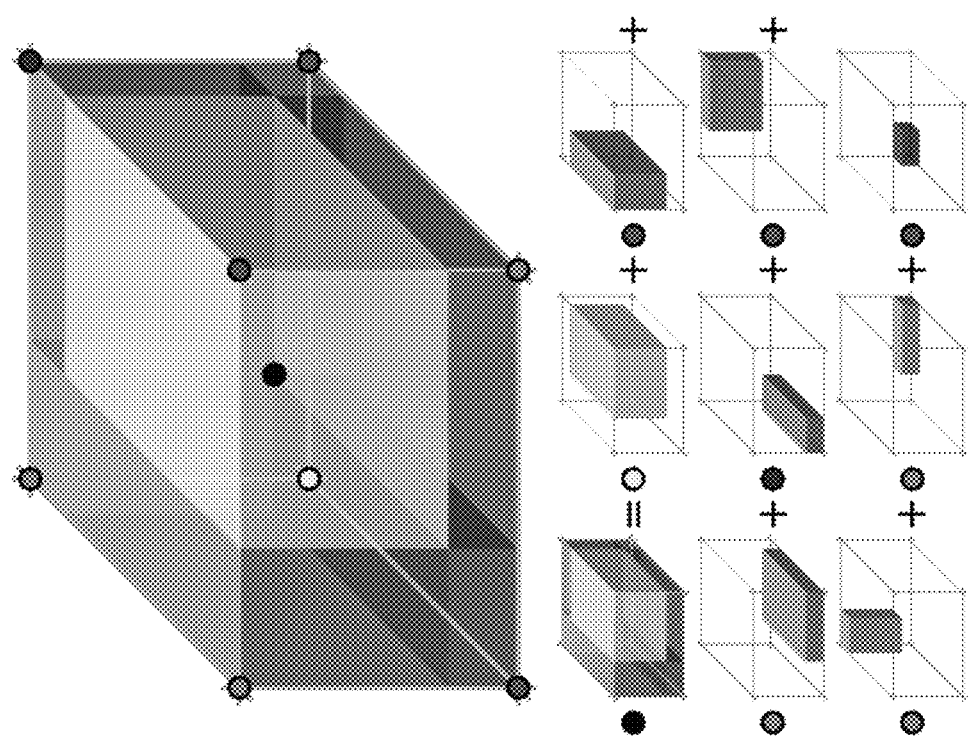
FIG. 3B illustrates a schematic geometric visualization of trilinear interpolation, in a process for automated segmenting of bones in medical imaging, according to an embodiment.

In some embodiments, to automatically generate the inputs to the CNNs, i.e., boxes of the aforementioned physical dimensions (Net25 and Net51), the image dataset is interpolated (through sub-sampling and/or up-sampling), and mapping of the current voxel in the new image dataset volume after interpolation is performed. In some embodiments, trilinear interpolation is used, wherein a new grid is produced at the desired resolution (for example, 1×1×2 mm$^3$). The value of each voxel on the new grid is calculated as a linear combination of the data values (of the neighboring voxels) in the original grid (of the CT scan). FIG. 3B provides a schematic geometric visualization of such trilinear interpolation. The value at the desired point and the entire volume is equal to the sum of the products of the value at each corner and the partial volume diagonal opposite the corner.

In some embodiments, the 3-D image obtained after interpolation undergoes histogram normalization before being passed to the CNNs. Because there can be differences between the HU from different scans (depending on the scanner and scanning protocol), histogram normalization is needed to create a certain invariance with the changes in the HU scale, so the gray levels in each cropped image ("box") are mapped linearly to [0, 1600] (wherein 1,600 different levels of gray represent enough information for classification). This linear mapping creates a problem for scans in which there are very high or very low HU, which due to the linear mapping will map the other HU to one of the ends of the histogram. Therefore, this histogram normalization is done so that only 98% of the HU values are mapped to the range [0, 1600]. One percent of the voxels with the highest HU and one percent of the voxels with the lowest HU are mapped to the extreme values—{0, 1600}, while all the voxels in the medium are linearly mapped to that range.

Figure 4:
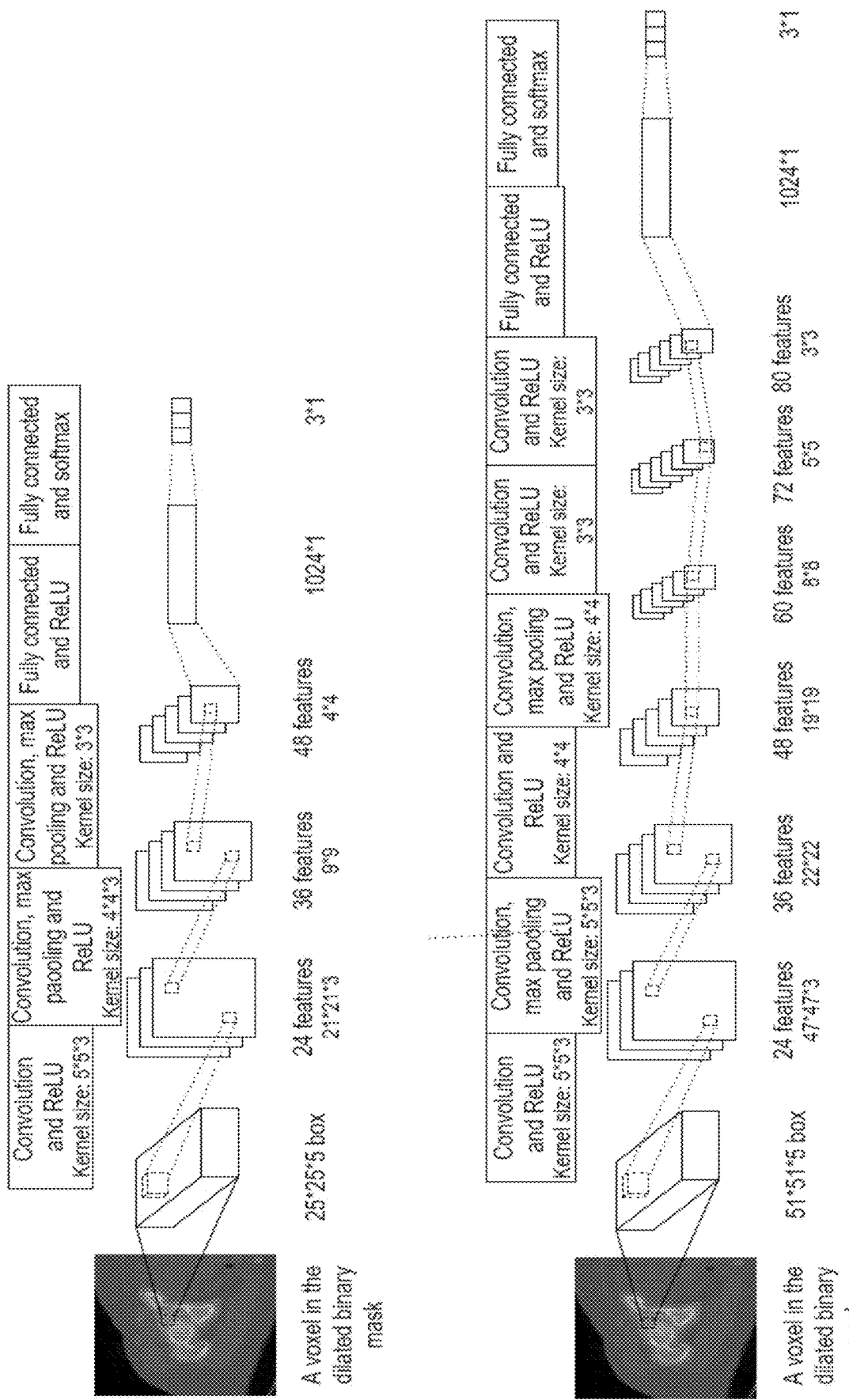
FIG. 4 illustrates a convolutional neural network.

In some embodiments, there are next employed one or more CNNs to automatically classify each voxel in the resulting image dataset as either femur, pelvis, or other tissue. One or more of the CNNs employed by the present process may comprise a convolution layer, followed by a maxpooling layer, followed by a layer with an activation function. See, for example, LeCun, Yann, et al. "Gradient-based learning applied to document recognition," Proceedings of the IEEE 86.11 (1998): 2278-2324. This arrangement repeats itself several times in each network, and in each iteration the images become smaller, and the number of features increases, as schematically illustrated in FIG. 4. Finally, the features are mapped with a fully connected layer to an array of size 1024. From it, with another fully connected layer, the values are mapped to an array of size three, which is the number the current process aims to classify (i.e., femur, pelvis, other tissue).

In some embodiments, at least one of the CNNs used by the present process is trained using a training set comprising images with manually segmented femurs, pelvises, and surrounding tissues. In each image of the training set, the voxels belonging to a femur, a pelvis, and other tissues, are manually labelled. The training images are then interpolated, cut and normalized as described above. In some embodiments, the training set comprises between 50 and 150 manually segments images, however fewer or more images may be used. In some embodiments, the training set comprises between 7 and 25 million voxels, wherein each voxel is labelled as noted above. In some embodiments, the CNNs are trained by employing a mini-batch method with Adam optimizer for 50 epochs. See Appendix A below. See, for example, Ioffe, Sergey, and Christian Szegedy, "Batch normalization: Accelerating deep network training by reducing internal covariate shift," International Conference on Machine Learning. 2015; Kingma, Diederik, and Jimmy Ba, "Adam: A method for stochastic optimization," arXiv preprint arXiv:1412.6980 (2014). In some embodiments, each mini-batch contains 2,000 boxes. To avoid overfitting, in some embodiments, after 500 batches, the CNN accuracy is checked using a validation set, and only if the obtained accuracy is higher than the maximum obtained accuracy so far, the CNN is saved for use in the automated segmentation process.

Because in the manual segmentation, the distribution of voxels labels is not uniform, the CNNs sometimes prefer to classify a femoral voxel as belonging to another class, in order to minimize a cost function. To prevent this, the number of sample voxels in each class is normalized, so that for half of the bones in the training set, only voxels that are labelled in the manual segmentation as belonging to the femur actually participate in the training. The sample rates for each class, before and after normalizing, are shown in Table 1.

TABLE 1

Rates of samples per class, before and after balancing

| | Pelvis | Femur | Other |
|---|---|---|---|
| Before Balancing | 43% | 25% | 32% |
| After balancing | 34.4% | 40% | 25.6% |

After running, each CNN provides a normalized grade (probability) by softmax function σ for association of the voxel for each of the three classes. The normalized grade of z sample to be tagged as j∈{1, 2, . . . K} class, is $$\sigma(z)_j = \frac{e^{z_j}}{\sum_{k=1}^{K} e^{z_k}},$$

where $z_i$ is the pre-normalized grade of sample z to be tagged as i class, as obtained from the CNN. After obtaining the probabilities, the voxel is tagged to the class with the highest probability of the 6 possible classifications (3 classes in each of the two inputs, Net25 and Net51).

Figure 5:
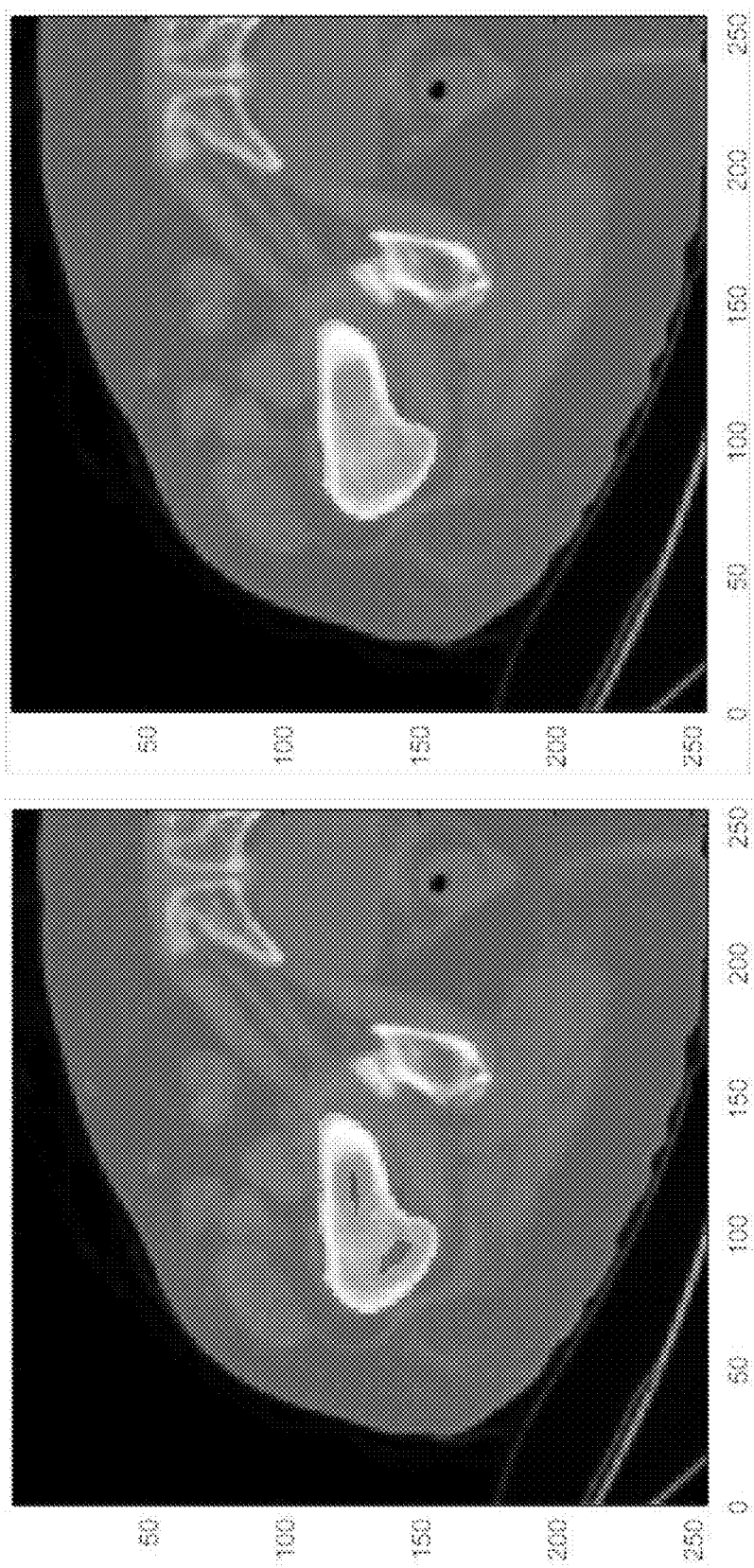
FIG. 5 shows a segmented femur before holes filling and after holes filling in a process for automated segmenting of bones in medical imaging, according to an embodiment.

In some embodiments, minor corrections are required after classifying the voxels using the CNNs and choosing the highest probability classification. One such correction which may be performed after CNN classifying is "holes filling." Sometimes, the bone boundary was well segmented by the CNNs, but the internal bone was incorrectly segmented or not classified at all. The holes filling is done in three identical steps, each of them performed on different dimensions of the three-dimensional volume. In the first step, each slice that is parallel to the XY plane is processed individually. The holes filling in each slice is done by finding the largest connected component of the background with a two-dimensional filter of 4 neighbors (no diagonals), and setting each pixel that does not belong to this component to be a part of the femur. FIG. 5 shows a segmented femur before holes filling (panel A) and after holes filling (panel B). The second and third stages are similar to the first stage, and differ in that the slices in these steps are parallel to the YZ plane (in the second step) and the XZ plane (in the third step).

Figure 6A:
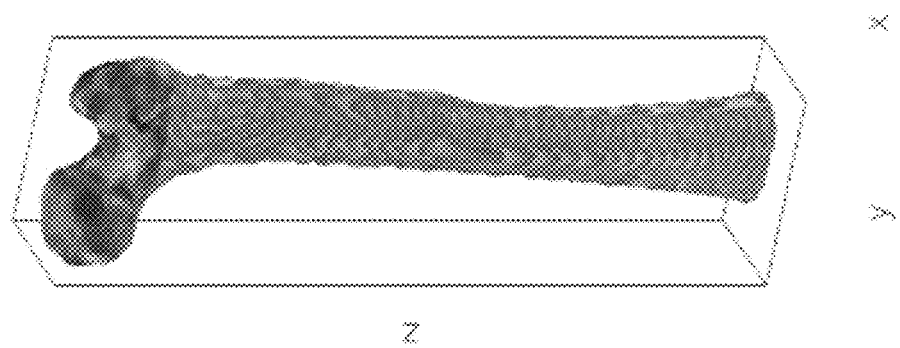
FIGS. 6A-6C show the results of the smoothing process in a process for automated segmenting of bones in medical imaging, according to an embodiment.
Figure 6B:
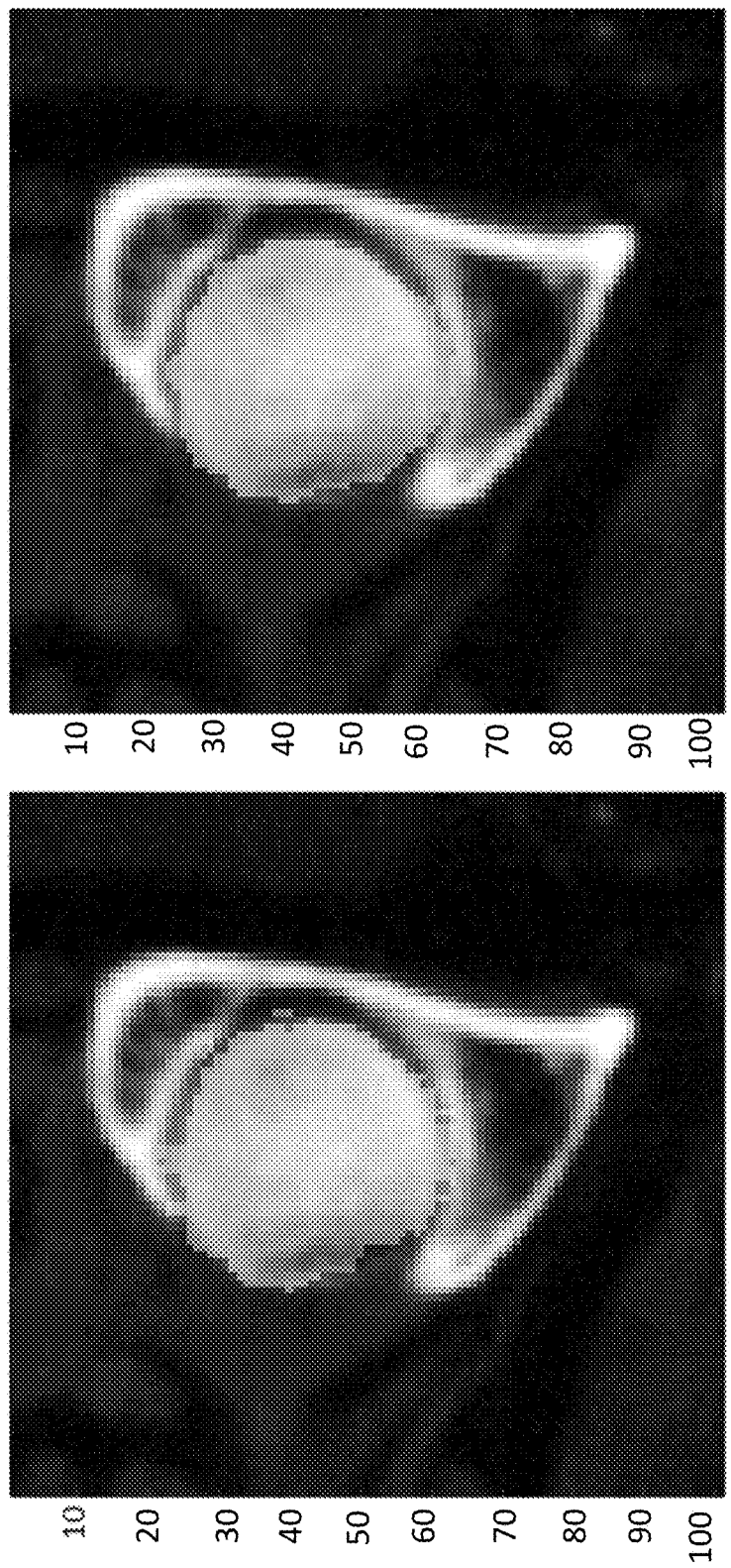
Figure 6C:
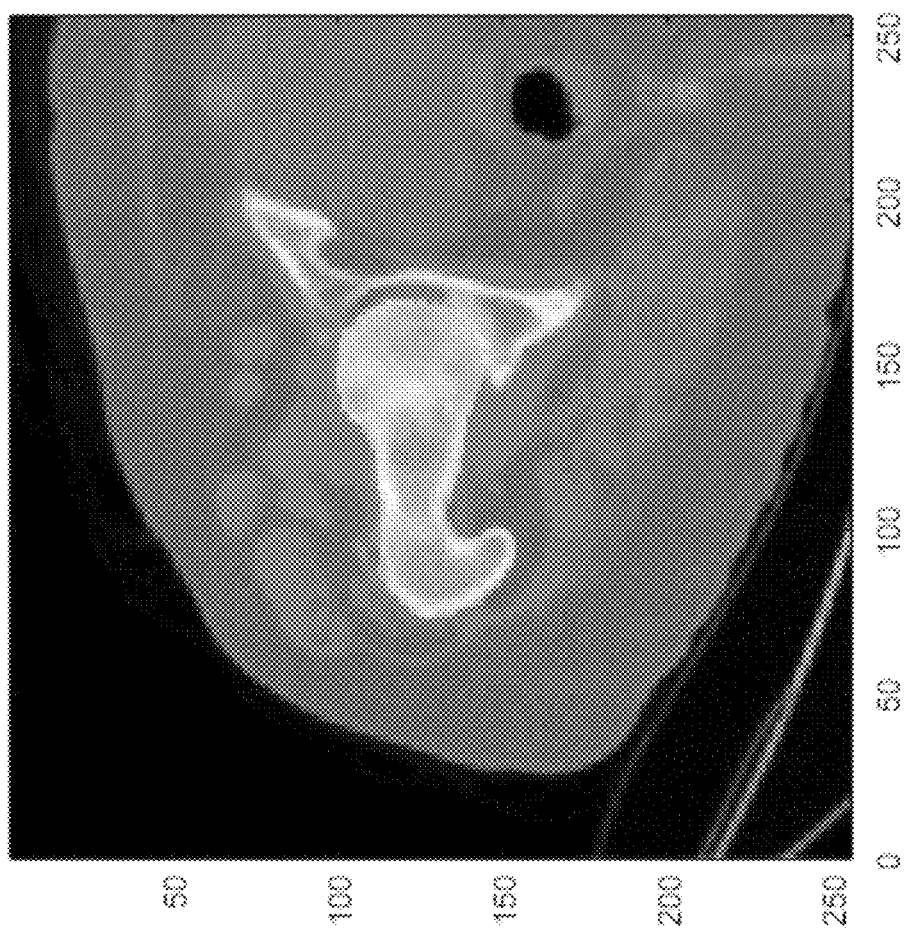

In some embodiments, following "holes filling," the largest connected component is found again, as described above. This is done to remove individual "island" voxels which may have been classified mistakenly as belonging to the femur. Finally, in some embodiments, additional morphological opening and closing are performed on the binary mask, for smoothing the bone and obtaining the final result. The smoothing is required because each voxel is classified by itself regardless of the neighboring voxels classification, and therefore a sharp curvature can be obtained in the resulting binary mask. FIGS. 6A-6C show the results of the smoothing process. FIG. 6A shows a fully segmented femur. FIG. 6B shows slices from the femoral head and the corresponding segmentation before the smoothing (panel A) and after the smoothing (panel B). FIG. 6C shows a typical slice of segmented bone; the red mask is the result of the automated segmentation according to the present process.

Figure 7:
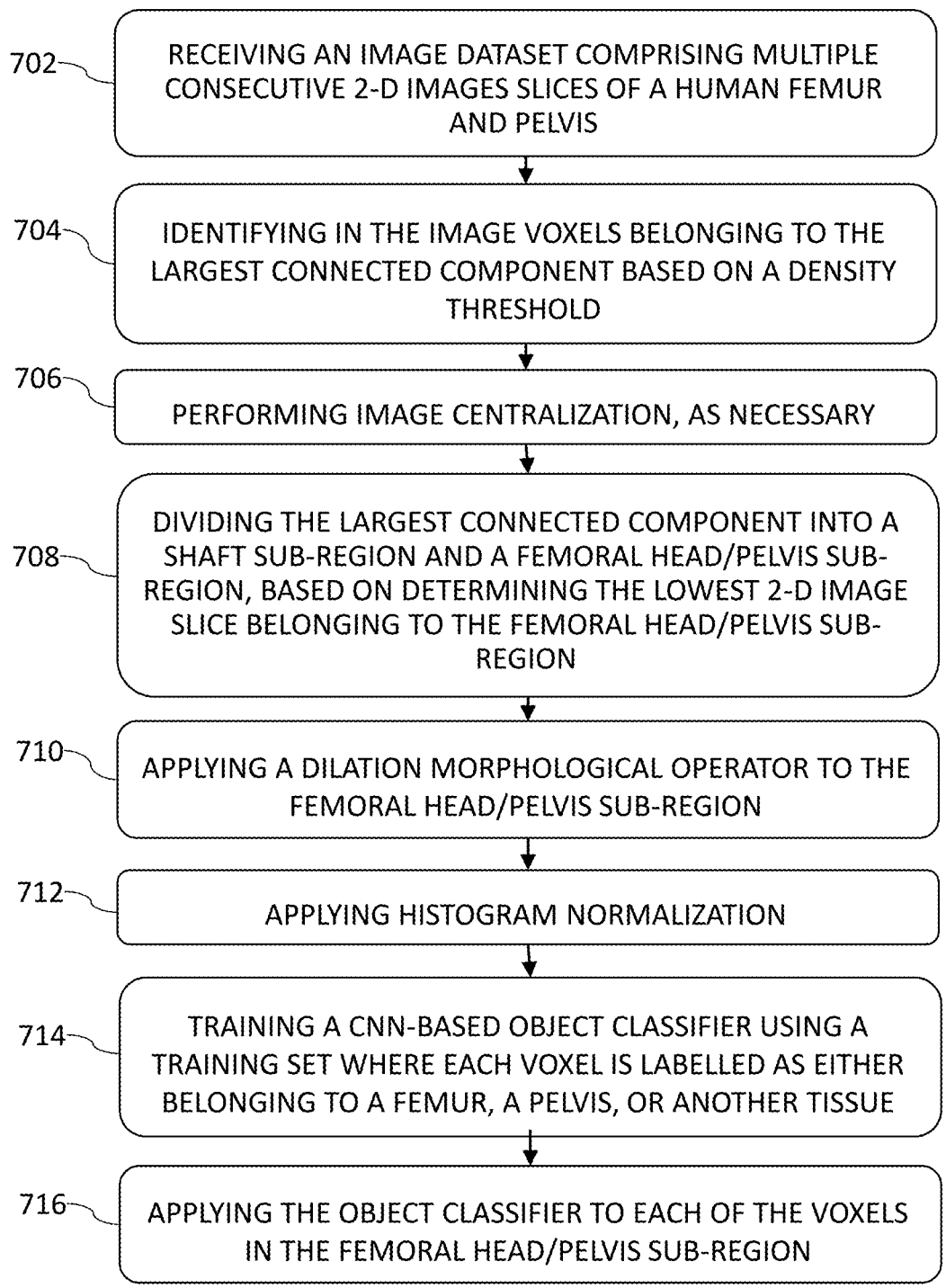
FIG. 7 is a flow chart of a method for automated segmenting of bones in medical imaging, according to an embodiment.

FIG. 7 is a flow chart of a method for automated segmentation of bones in an image, according to certain embodiments. In a step 702, the present process begins by receiving an image dataset comprising multiple consecutive 2-D images slices of a human femur and pelvis. In a step 704, voxels belonging to the largest connected component are identified in the image, based on a density threshold. In a step 706, an optional step of image centralization is applied to the image, as may be necessary. In a step 708, the largest connected component is divided in into a shaft sub-region and a femoral head/pelvis sub-region, based on determining the lowest 2-D image slice belonging to the femoral head/pelvis sub-region. In a step 710, a dilation morphological operator is applied to the to the femoral head/pelvis sub-region, to identify all neighboring voxels which will participate in the CNN-based final segmentation. In a step 712, a histogram normalization is applied to the image. In a step 714, a CNN-based object classifier is being trained using a training set where each voxel is labelled as either belonging to a femur, a pelvis, or another tissue. And is a step 716, the object classifier is applied to each of the voxels in the femoral head/pelvis sub-region, to reach a final segmentation of the femur from its surrounding tissue.

Experimental Results

The accuracy measurements of the automated segmentation process disclosed herein were calculated in relation to manual segmentation performed on the same bones. The two measures used were Dice-Sorensen Coefficient and Average Surface Distance (ASD), as will further be explained below. The segmentation was tested on 25 bones (which were not used in the training process), of males and females, young and adults. The segmented bones were compared in three ways: (i) comparison of the segmentation of the slices below the LSCV; (ii) comparison of the segmentation of the slices above the LSCV; and (iii) comparison of an entire bone.

The Dice-Sørensen coefficient (DSC; see, Dice, Lee R. "Measures of the amount of ecologic association between species." Ecology 26.3 (1945):297-302) has a number of versions, all of which have a similar principle—checking the overlap between the objects (2-D or 3-D masks). The results of the measure are in the range [0, 1], where 1 is obtained for two completely overlapped volumes, and 0 is obtained for two volumes that have nothing in common. Let two points sets X, Y, their DSC index will be calculated as $$DSC(X,Y) = \frac{2|X \cap Y|}{|X|+|Y|}.$$

Overall, the average DCS for the head only is 0.962, and the average DCS for the whole femur is 0.979. The full results are shown in Tables 2 and 3 below.

Average surface distance (ASD, see Gerig, Guido, Matthieu Jomier, and Miranda Chakos. "Valmet: A new validation tool for assessing and improving 3D object segmentation." Medical Image Computing and Computer-Assisted Intervention MICCAI 2001. Springer Berlin/Heidelberg, 2001) is a two tuples metric, based on Hausdorff Distance (HD). HD metric measures "distance" between two subsets of metric space. Informally, let X, Y⊆B where B is a metric space, for each x∈X find the point y∈Y which is the closest point to x, and calculate the distance d(x, y). HD is the maximal distance obtained in this way. The calculation is not symmetric, therefore, the opposite calculation should also be calculated. Formally, for the previous subsets of the metric space with the metric d(x, y):

HD(X,Y)=max{sup$_{x \in X}$inf$_{y \in Y}$d(x,y),sup$_{y \in Y}$inf$_{x \in X}$ d(x,y)}.

ASD is obtained by averaging the minimum distances instead of selecting the maximum value:

$$ASD(X,Y) = \frac{1}{2}\left[\frac{1}{|X|}\sum_{i=1}^{|X|} \min_{y \in Y}\{d(x_i, y)\} + \frac{1}{|Y|}\sum_{si=1}^{|Y|} \min_{x \in X}\{d(x, y_i)\}\right].$$

The results of the index are in the range [0, ∞). In ASD index, a low grade means closeness and high matching between the subsets, i.e. ASD(X, Y) $\xrightarrow{X \to Y}$ 0.

Figure 8:
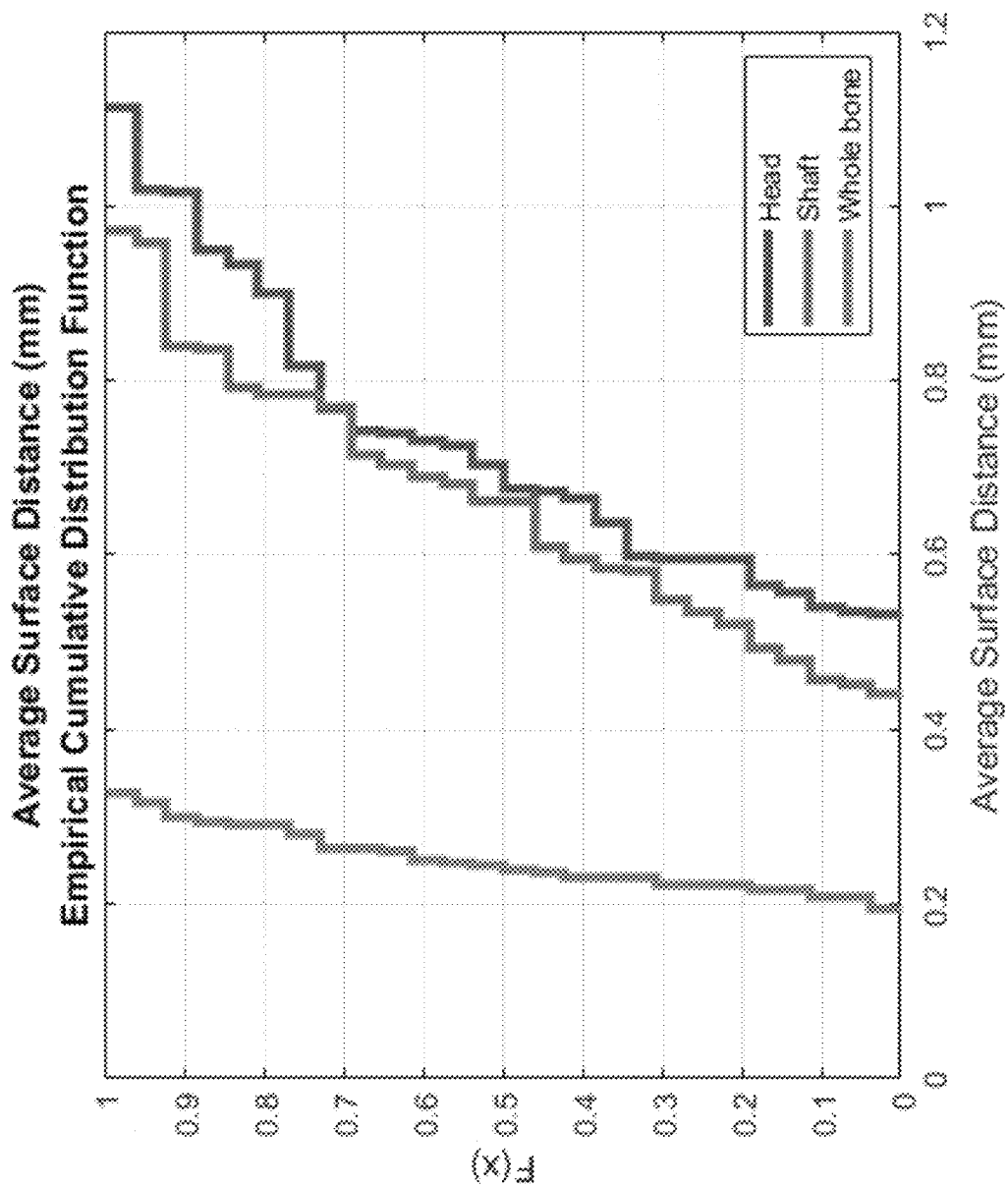
FIG. 8 illustrates experimental results of a process for automated segmenting of bones in medical imaging, according to an embodiment.

Overall, the average ASD for the head only is 0.66 mm, and the average ASD for the whole femur is 0.35 mm. All results are shown in Tables 2 and 3 below, and the empirical cumulative distribution functions (ECDF) are shown in FIG. 8 for head, shaft and whole femur. Each CT scan has different voxel dimensions, hence the average ASD in voxel edge units is 0.29.

TABLE 2

| Segmentation accuracy for all femur bones | |
|---|---|
| DSC Mean | 0.98 |
| DSC Meadian | 0.98 |

TABLE 2-continued

Segmentation accuracy for all femur bones

| | |
|---|---|
| DSC STD | 0.003 |
| DSC Min | 0.97 |
| DSC Max | 0.98 |
| ASD Mean (mm) | 0.35 |
| ASD Meadian (mm) | 0.35 |
| ASD STD | 0.06 |
| ASD Min (mm) | 0.23 |
| ASD Max (mm) | 0.49 |
| $\frac{ASD \text{ Mean}}{\text{Voxel Size}}$ Mean | 0.29 |
| HD Mean (mm) | 6.97 |

TABLE 3

Comparison of segmentation accuracy for all femoral heads for each CNN separately and for the union results

| | Net25 | Net51 | Net25 + Net51 |
|---|---|---|---|
| DSC Mean | 0.96 | 0.96 | 0.96 |
| DSC Meadian | 0.96 | 0.96 | 0.96 |
| DSC STD | 0.01 | 0.01 | 0.01 |
| DSC Min | 0.94 | 0.94 | 0.95 |
| DSC Max | 0.97 | 0.97 | 0.98 |
| ASD Mean (mm) | 0.76 | 0.69 | 0.66 |
| ASD Meadian (mm) | 0.77 | 0.69 | 0.67 |
| ASD STD | 0.19 | 0.15 | 0.14 |
| ASD Min (mm) | 0.43 | 0.43 | 0.39 |
| ASD Max (mm) | 1.2 | 1 | 0.9 |

Two CNNs were used for segmentation. Consolidating results from both networks yields better results than any CNN separately. Analysis of segmentations obtained from each CNN separately, and compared to the weighting of the two networks together, is shown in Table 3. Significantly, weighing the two networks together yields a more accurate segmentation than each network separately. In addition, about 50% of the voxels classified by CNNs were predicted by Net25, and about 50% of the voxels were predicted by Net51. There does not appear to be any anatomical areas in the bone in which there is clearly a preference of one network over the other.

Another comparison was performed of the outcome of a CNN which classifies three classes (femur, pelvis and soft tissue), as described above, with a CNN which classifies two classes (femur and non-femur). The percentage of voxels classified correctly was checked. The use of three classes classifier yields slightly better accuracy. It can be assumed that the cause of this result is the significant difference between soft tissue and pelvis tissue, so networks that look on both tissues in the same way are less successful in generalizing the model. The detailed comparison is given in Table 4, which presents the percentage of voxels classified correctly as femur and correctly as non-femur:

TABLE 4

Comparing CNN performance when classifying by two-classes or three-classes

| | Two Classes | Three Classes |
|---|---|---|
| Net25 | 96.38% | 97.3% |
| Net51 | 96.47% | 97.39% |
| Net25 + Net51 | 96.8% | 97.46% |

The measures examined, ASD and DSC, were compared with corresponding measures reported in other papers on segmentation of femur and pelvis bone. Table 5 summarizes the various methods, the grades obtained in each one, whether the method is fully or semi-automatic, and the number of test bones, as noted in the paper.

TABLE 5

Comparison of results between different methods. The measures shown are average ± standard deviation

| Method | DCS | ASD (mm) | Fully/Semi Automatic | Number of Test Bones |
|---|---|---|---|---|
| Current Disclosure | 0.98 ± 0.003 | 0.35 ± 0.06 | Fully automatic | 26 |
| Xia et al.[1] | 0.95 ± 0.02 | 0.85 ± 0.46 | Fully automatic | 38 |
| Schmid et al.[2] | Unspecified | 1.25 ± 0.53 | Semi automatic | 43 |
| Fripp et al.[3] | 0.96 | Unspecified | Fully automatic | 20 |
| Chengwen et al.[4] | 0.974 ± 0.008 | 0.36 ± 0.12 | Fully automatic | 60 |
| Cheng et al.[5] | 0.91 ± 4.82 | 1.22 ± 0.98 | Fully automatic | Unspecified |
| Zoroofi et al.[6] | 0.94 | 0.91 | Fully automatic | Unspecified |
| Yokota et al.[7] | Unspecified | 0.98 | Fully automatic | Unspecified |

[1]Xia, Ying, et al. "Automated bone segmentation from large field of view 3D MR images of the hip joint." Physics in medicine and biology 58.20 (2013): 7375.
[2]Schmid, Jérôme, Jinman Kim, and Nadia Magnenat-Thalmann. "Robust statistical shape models for MRI bone segmentation in presence of small field of view." Medical image analysis 15.1 (2011): 155-168.
[3]Fripp, Jurgen, et al. "Automatic segmentation of the bone and extraction of the bone cartilage interface from magnetic resonance images of the knee." Physics in Medicine and Biology 52.6 (2007): 1617.
[4]Chu, Chengwen, et al. "Facts: fully automatic ct segmentation of a hip joint." Annals of biomedical engineering 43.5 (2015): 1247-1259.
[5]Cheng, Yuanzhi, et al. "Automatic segmentation technique for acetabulum and femoral head in CT images." Pattern Recognition 46.11(2013): 2969-2984.
[6]Zoroofi, Reza Aghaeizadeh, et al. "Automated segmentation of acetabulum and femoral head from 3-D CT images." IEEE Transactions on Information Technology in Biomedicine 7.4 (2003): 329-343.
[7]Yokota, F., T. Okada, M. Takao, S. Sugano, Y. Tada, N. Tomiyama, and Y. Sato. Automated CT segmentation of diseased hip using hierarchical and conditional statistical shape models. MICCAI 2013, Part II, pp. 190-197, 2013 (Cited result was extracted from (5) above).

The computation time of segmentation was measured on a typical CT scans at an average resolution of 512×512×320 voxels. The computations were performed on a PC with an Intel i7-6800K processor and 64 GB RAM. The calculations for CNNs were done on the GPU using a Nvidia GeForce GTX 1080Ti graphic card. The average segmentation time was 12 minutes: 2.5 minutes to load files, cut them, align them and find LSCV, 2.5 minutes for running Net25, 5 minutes for running Net51, 2 minutes for post-processing. The CNNs were run using Tensorflow libraries with a Python code.

APPENDIX A: TRAINING SET

Figure 9A:
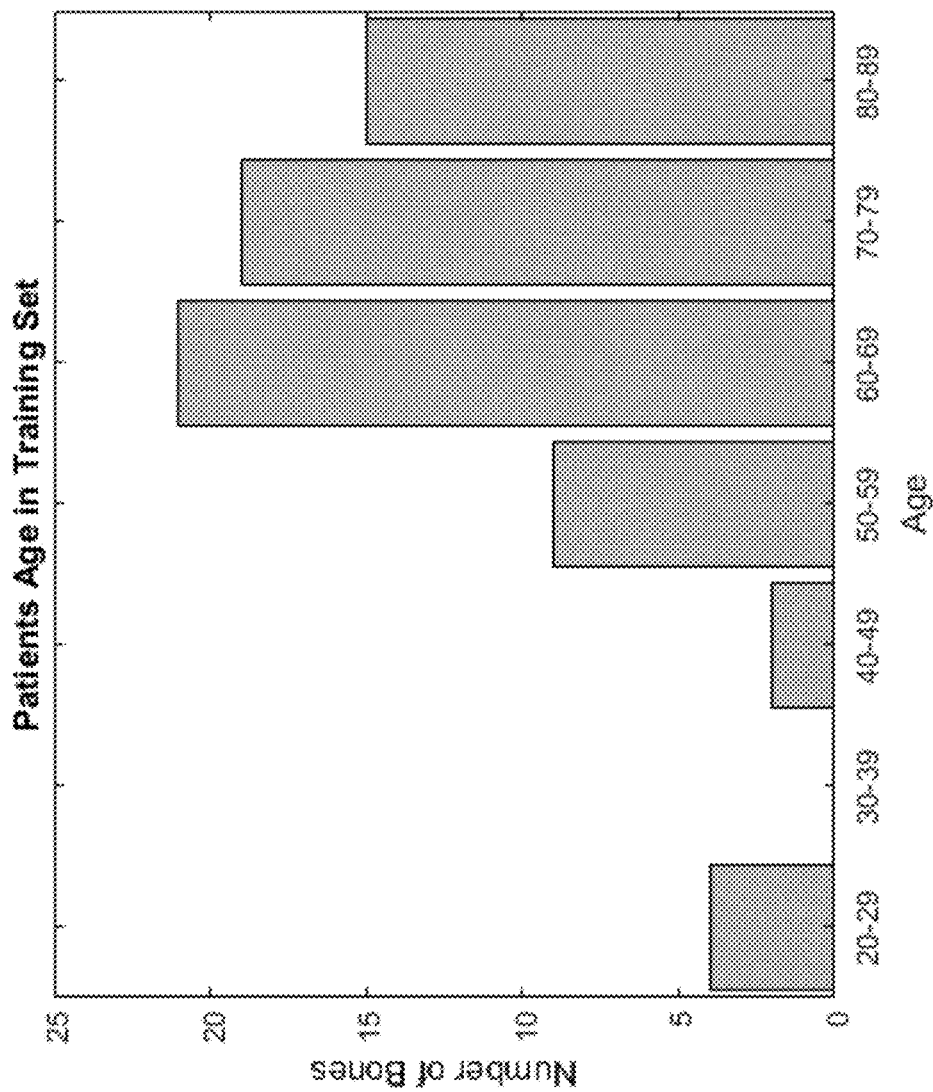
FIGS. 9A-9B shows data of bones used in a training set, in a process for automated segmenting of bones in medical imaging, according to an embodiment.
Figure 9B:
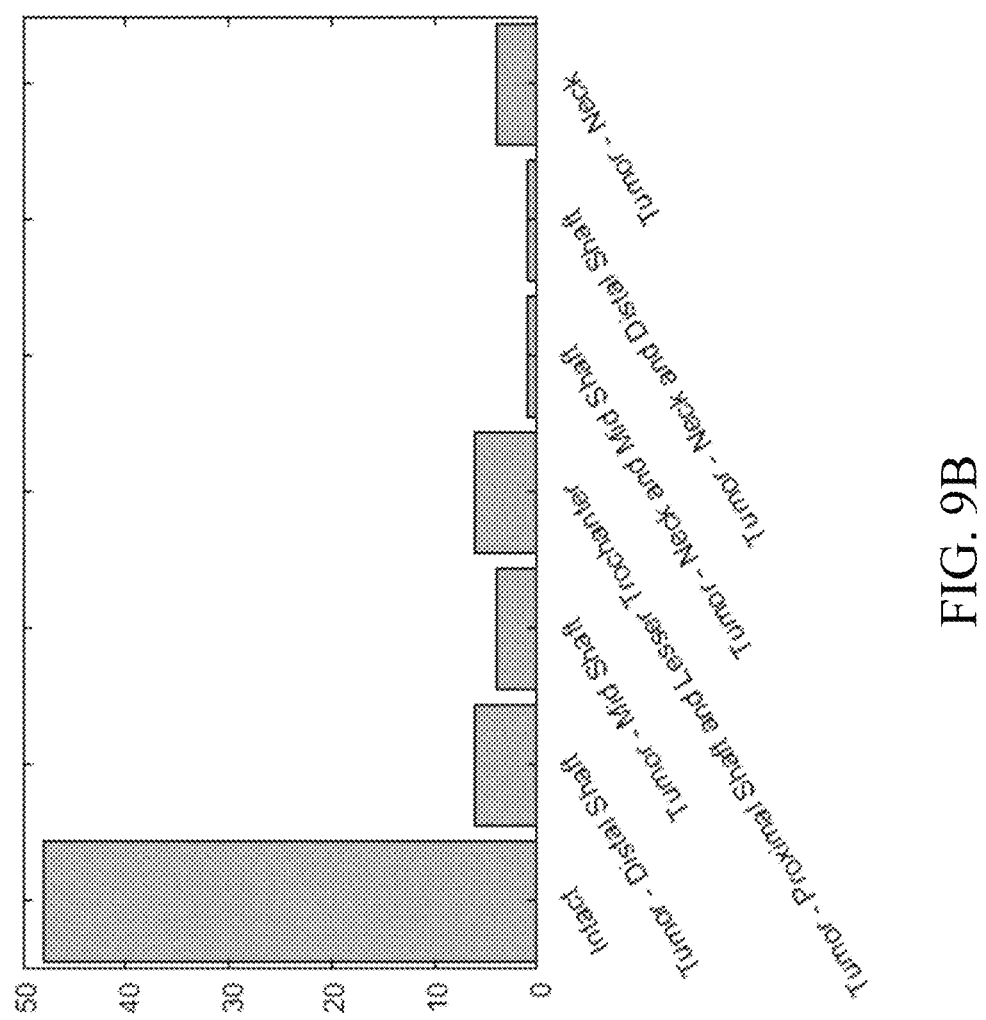

Patients whose femurs were used for training the CNNs had an age range of 22-89 age range (FIG. 9A), of which 29 were males and 41 were females. Most femurs were healthy, but some had tumors in different locations (FIG. 9B). Data of bones in training set is shown in Table A1.

TABLE A1

List of bones in training set

| Bone ID | Gender | Age | Disease |
|---|---|---|---|
| Train1 | M | 56 | Tumor-mid shaft |
| Train2 | F | 70 | Tumor-distal shaft |
| Train3 | F | 40 | Tumor-distal shaft |
| Train4 | F | 40 | Intact |
| Train5 | F | 55 | Tumor-mid shaft |
| Train6 | F | 55 | Intact |
| Train7 | M | 71 | Intact |
| Train8 | M | 71 | Intact |
| Train9 | F | 89 | Intact |
| Train10 | F | 89 | Intact |
| Train11 | F | 78 | Intact |
| Train12 | F | 78 | Tumor-proximal shaft and lesser trochanter |
| Train13 | M | 82 | Tumor-distal shaft |
| Train14 | M | 82 | Tumor-distal shaft |
| Train15 | M | 82 | Intact |
| Train16 | M | 82 | Tumor-distal shaft |
| Train17 | F | 22 | Tumor-proximal shaft and lesser trochanter |
| Train18 | F | 22 | Intact |
| Train19 | M | 63 | Intact |
| Train20 | M | 63 | Intact |
| Train21 | M | 55 | Intact |
| Train22 | F | 70 | Intact |
| Train23 | F | 70 | Tumor-proximal shaft and lesser trochanter |
| Train24 | M | 56 | Tumor-mid shaft |
| Train25 | M | 73 | Tumor-proximal shaft and lesser trochanter |
| Train26 | M | 67 | Intact |
| Train27 | M | 67 | Tumor-neck and mid shaft |
| Train28 | F | 83 | Intact |
| Train29 | F | 66 | Tumor-proximal shaft and lesser trochanter |
| Train30 | F | 66 | Intact |
| Train31 | F | 81 | Intact |
| Train32 | F | 81 | Intact |
| Train33 | F | 51 | Tumor-neck and distal shaft |
| Train34 | F | 51 | Tumor-neck |
| Train35 | M | 73 | Tumor-neck |
| Train36 | F | 79 | Tumor-neck |
| Train37 | F | 79 | Intact |
| Train38 | F | 27 | Tumor-mid shaft |
| Train39 | F | 27 | Tumor-proximal shaft and lesser trochanter |
| Train40 | F | 62 | Intact |
| Train41 | F | 62 | Intact |
| Train42 | F | 58 | Tumor-distal shaft |
| Train43 | F | 58 | Tumor-neck |
| Train44 | F | 64 | Intact |
| Train45 | F | 66 | Intact |
| Train46 | F | 66 | Intact |
| Train47 | F | 64 | Intact |
| Train48 | F | 64 | Intact |
| Train49 | F | 64 | Intact |
| Train50 | F | 64 | Intact |
| Train51 | F | 64 | Intact |
| Train52 | F | 64 | Intact |
| Train53 | M | 75 | Intact |
| Train54 | M | 75 | Intact |
| Train55 | M | 75 | Intact |

TABLE A1-continued

List of bones in training set

| Bone ID | Gender | Age | Disease |
|---|---|---|---|
| Train56 | M | 75 | Intact |
| Train57 | F | 74 | Intact |
| Train58 | F | 74 | Intact |
| Train59 | F | 74 | Intact |
| Train60 | F | 74 | Intact |
| Train61 | M | 80 | Intact |
| Train62 | M | 80 | Intact |
| Train63 | M | 80 | Intact |
| Train64 | M | 80 | Intact |
| Train65 | M | 80 | Intact |
| Train66 | M | 80 | Intact |
| Train67 | M | 67 | Intact |
| Train68 | M | 67 | Intact |
| Train69 | M | 67 | Intact |
| Train70 | M | 67 | Intact |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    at least one hardware processor; and
    a non-transitory computer-readable storage medium having stored thereon program instructions, the program instructions executable by the at least one hardware processor to:
        receive a three-dimensional (3-D) image dataset comprising a plurality of consecutive cross-sectional two-dimensional (2-D) images of a region of a human body, wherein said region comprises at least (i) a portion of a first bone adjacent (ii) at least a portion of a second bone;
        identify in the 3-D image dataset a plurality of voxels belonging to a contiguous volume comprising said at least a portion of said first bone and said at least a portion of said second bone, wherein said identifying is based on each of said voxels meeting a specified threshold;
        identify one of said 2-D images as a boundary image, representing a boundary of the contiguous volume;
        extract from said 3-D image dataset a subset of said 2-D images, based on the 2 D boundary image; and
        apply a trained machine learning classifier to said subset of said 2-D images, to classify each voxel in said subset of said 2-D images as belonging to one of: said first bone, said second bone, and a non-bone tissue.

2. The system of claim 1, wherein said machine learning classifier is trained, at a training stage, on a training set comprising:
    (i) a plurality of voxels, each belonging to one of said first bone, said second bone, and a non-bone tissue; and
    (ii) labels associated with each of said first bone, said second bone, and said non-bone tissue.

3. The system of claim 2, wherein each of said plurality of voxels is labeled with one of said labels.

4. The system of claim 1, wherein said 3-D image dataset is a tomographic image dataset acquired through a technique selected from the group consisting of: computed tomography (CT), magnetic resonance imaging (MM), positron emission tomography (PET), single photon emission tomography, ultrasound, and X-ray.

5. The system of claim 1, wherein said first bone is selected from the group consisting of: a femur, a tibia, a fibula, a humerus, a radius, and an ulna.

6. The system of claim 1, wherein said specified threshold is a density threshold having a range of between 75 and 250 on the Hounsfield Unit (HU) scale.

7. The system of claim 1, wherein said identifying of one of said 2-D images as a boundary image is based, at least in part, on a similarity metric between said boundary image and one or more consecutive images within said image dataset, and wherein said similarity metric is based, at least in part, on a number of voxels belonging to a largest connected component in each of said boundary image and said one or more consecutive images.

8. A method for automated segmentation of a bone in an image, the method comprising:
   receiving a three-dimensional (3-D) image dataset comprising a plurality of consecutive cross-sectional two-dimensional (2-D) images of a region of a human body, wherein said region comprises at least (i) a portion of a first bone adjacent (ii) at least a portion of a second bone, and wherein said at least a portion of said first bone comprises at least a portion of a shaft region and a head region of said first bone;
   identifying in the 3-D image dataset a plurality of voxels belonging to a contiguous volume comprising said at least a portion of said first bone and said at least a portion of said second bone, wherein said identifying is based on each of said voxels meeting a specified threshold;
   identifying one of said 2-D images as a boundary image, representing a boundary of the contiguous volume;
   extracting from said 3-D image dataset a subset of said 2-D images comprising a subset of said plurality of identified voxels belonging only to said head region and said at least a portion of said second bone, based on the identified 2 D boundary image; and
   applying a trained machine learning classifier to said subset of said 2-D images, to classify each voxel in said subset of said 2-D images as belonging to one of: said first bone, said second bone, and a non-bone tissue.

9. The method of claim 8, further comprising training said machine learning classifier, at a training stage, on a training set comprising
   (i) a plurality of voxels, each belonging to one of said first bone, said second bone, and a non-bone tissue; and
   (ii) labels associated with each of said first bone, said second bone, and said non-bone tissue.

10. The method of claim 9, wherein at least 40% of said plurality of voxels belong to said first bone.

11. The method of claim 8, wherein said 3-D image dataset is a tomographic image dataset acquired through a technique selected from the group consisting of: computed tomography (CT), magnetic resonance imaging (MM), positron emission tomography (PET), single photon emission tomography, ultrasound, and X-ray.

12. The method of claim 8, wherein said first bone is selected from the group consisting of: a femur, a tibia, a fibula, a humerus, a radius, and an ulna.

13. The method of claim 8, wherein said specified threshold is a density threshold having a range of between 75 and 250 on the Hounsfield Unit (HU) scale.

14. The method of claim 8, wherein said identifying of one of said 2-D images as a boundary image is based, at least in part, on a similarity metric between said boundary image and one or more consecutive images within said image dataset, and wherein said similarity metric is based, at least in part, on a number of voxels belonging to a largest connected component in each of said boundary image and said one or more consecutive images.

15. A computer program product for automated segmentation of a bone in an image, the computer program product comprising program code embodied on a non-transitory computer-readable storage medium, the program code executable by at least one hardware processor to:
   receive a three-dimensional (3-D) image dataset comprising a plurality of consecutive cross-sectional two-dimensional (2-D) images of a region of a human body, wherein said region comprises (i) at least a portion of a first bone adjacent (ii) at least a portion of a second bone, and wherein said at least a portion of said first bone comprises at least a portion of a shaft region and a head region of said first bone;
   identify in the 3-D image dataset a plurality of voxels belonging to a contiguous volume comprising said at least a portion of said first bone and said at least a portion of said second bone, wherein said identifying is based on each of said voxels meeting a specified threshold;
   identify one of said 2-D images as a boundary image, representing a boundary of the contiguous volume;
   extract from said 3-D image dataset a subset of said 2-D images comprising a subset of said plurality of identified voxels belonging only to said head region and said at least a portion of said second bone, based on the identified 2 D boundary image; and
   apply a trained machine learning classifier to said subset of said 2-D images, to classify each voxel in said subset of said 2-D images as belonging to one of: said first bone, said second bone, and a non-bone tissue.

16. The computer program product of claim 15, wherein said machine learning classifier is trained, at a training stage, on a training set comprising
   (i) a plurality of voxels, each belonging to one of said first bone, said second bone, and a non-bone tissue, and
   (ii) labels associated with each of said first bone, said second bone, and said non-bone tissue.

17. The computer program product of claim 15, wherein said first bone is selected from the group consisting of: a femur, a tibia, a fibula, a humerus, a radius, and an ulna.

18. The computer program product of claim 15, wherein said specified threshold is a density threshold having a range of between 75 and 250 on the Hounsfield Unit (HU) scale.

19. The computer program product of claim 15, wherein said identifying is based, at least in part, on a similarity metric between said boundary image and one or more consecutive images within said image dataset, and wherein said similarity metric is based, at least in part, on a number of voxels belonging to a largest connected component in each of said boundary image and said one or more consecutive images.

20. The system of claim 1, wherein the 2-D images of the subset of 2-D images comprise a subset of the plurality of identified voxels of the contiguous volume, and wherein the subset of voxels belong only to: (a) a head region and of the first bone, or (b) a portion of the second bone.

* * * * *